(12) United States Patent
Levesque et al.

(10) Patent No.: US 9,606,625 B2
(45) Date of Patent: Mar. 28, 2017

(54) HAPTICALLY-ENABLED DEFORMABLE DEVICE WITH RIGID COMPONENT

(71) Applicant: Immersion Corporation, San Jose, CA (US)

(72) Inventors: Vincent Levesque, Montreal (CA); Danny Grant, Laval (CA); Yiting Wang, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 99 days.

(21) Appl. No.: 14/512,719

(22) Filed: Oct. 13, 2014

(65) Prior Publication Data

US 2016/0103488 A1    Apr. 14, 2016

(51) Int. Cl.
*G09G 5/00*      (2006.01)
*G06F 3/01*      (2006.01)
*G06F 1/16*      (2006.01)

(52) U.S. Cl.
CPC ............ *G06F 3/016* (2013.01); *G06F 1/1652* (2013.01); *G09G 5/003* (2013.01); *G06F 2203/04102* (2013.01); *G09G 2380/02* (2013.01)

(58) Field of Classification Search
CPC .......... G06F 3/016; G06F 3/011; G06F 3/038; G06F 3/03333; G06F 3/03313
USPC ................................ 345/156–158, 173–179; 178/18.01–18.04
See application file for complete search history.

(56) References Cited

U.S. PATENT DOCUMENTS

| 2010/0172080 A1* | 7/2010 | Bestle ..................... G06F 3/016 361/679.21 |
| 2013/0197819 A1 | 8/2013 | Vanska et al. |
| 2014/0173155 A1 | 6/2014 | Slattery |
| 2014/0240108 A1 | 8/2014 | Matthews |

FOREIGN PATENT DOCUMENTS

| EP | 2648078 A2 | 10/2013 |
| KR | 20140003132 A | 1/2014 |
| WO | 2008150600 A1 | 12/2008 |

OTHER PUBLICATIONS

Ivan Poupyrev, "Gummi", http://www.ivanpoupyrev.com/projects/gummi.php, last downloaded on Oct. 9, 2014.
Johan Kildal et al., "Feel the Action: Dynamic Tactile Cues in the Interaction with Deformable UIs", Work-in-Progress: Tactile, CHI 2013: Changing Perspectives, Paris, France, CHI 2013 Extended Abstracts, Apr. 27-May 2, 2013, ACM 978-1-4503-1952-2/13/04, p. 1563-1568.

* cited by examiner

*Primary Examiner* — Kimnhung Nguyen
(74) *Attorney, Agent, or Firm* — Miles & Stockbridge P.C.

(57) ABSTRACT

A device includes a flexible component, such as a display and a rigid component coupled to the flexible component. An input circuit coupled to the flexible component can detect deformation of the flexible component. A response module can provide haptic feedback or another response based on the deformation. In some devices, the rigid component can be made of rigid members attached by a flexible connection and coupled to a motor. The flexible connection can be altered by the motor to cause the flexible component to deform from one state to another.

31 Claims, 7 Drawing Sheets

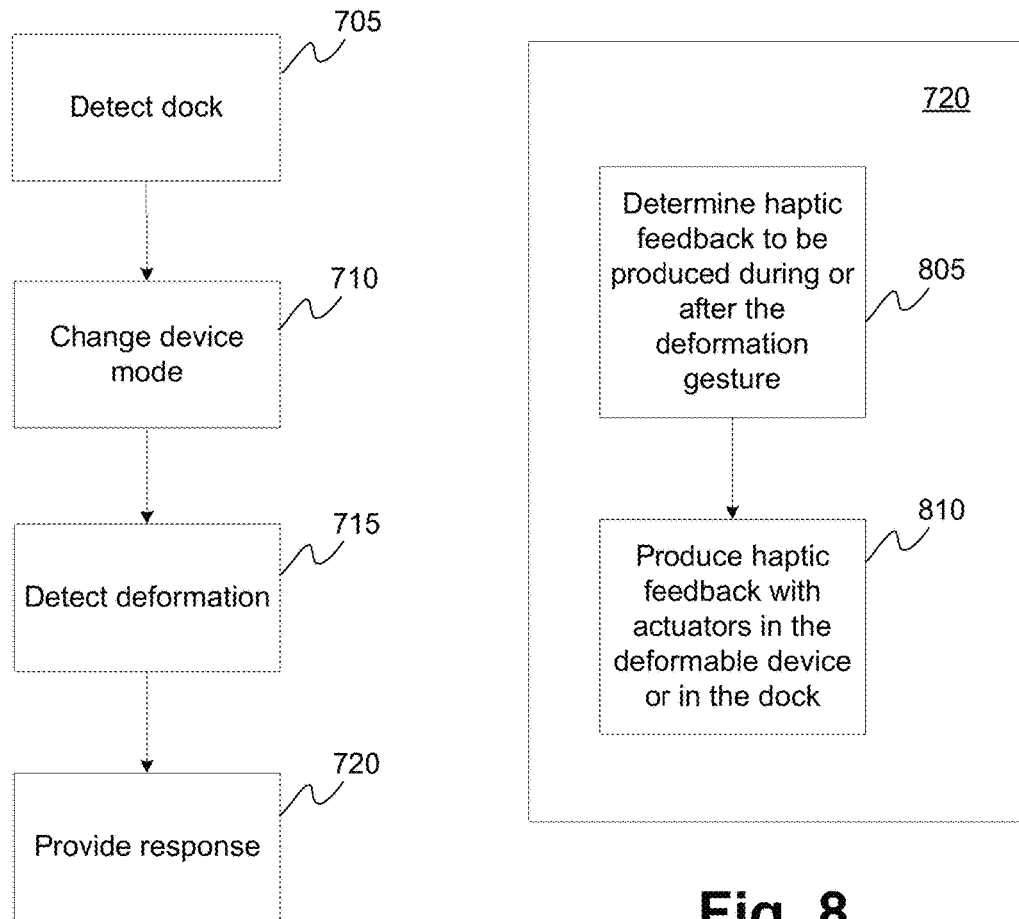

HAPTICALLY-ENABLED DEFORMABLE DEVICE WITH RIGID COMPONENT

FIELD

One embodiment is directed to a deformable device with a rigid component. More particularly, one embodiment is directed to a haptically-enabled deformable device with a rigid component.

BACKGROUND INFORMATION

Deformable electronic devices allow a user to manipulate the device by deforming the device. Deforming the device can include bending, folding, twisting, squeezing, and the like. Among other things, electronic devices can include displays.

Flexible displays can enable a wide array of interactions. Flexible displays can be deformed from a natural shape to other shapes. Examples of flexible displays include bendable, foldable, and rollable displays. Some bendable displays can be bent in almost any direction along multiple axes, while others may only be bendable in a single direction back or forth. Foldable displays can have one or more seamless hinges or the like without causing a break in pixel presentation in a display. Rollable displays can either be flexible or conformed to a particular curved shape. Some rollable displays can be understood as a bendable display in a single direction.

Further, electronic device manufacturers of all types of electronic devices strive to produce a rich interface for users. Conventional devices use visual and auditory cues to provide feedback to a user. In some user interfaces, kinesthetic feedback (such as active and resistive force feedback) and/or tactile feedback (such as vibration, texture, and heat) are also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

In order to generate vibration or other effects, many devices utilize some type of actuator or haptic output device. Known actuators used for this purpose include an electromagnetic actuator such as an solenoid actuator, an Eccentric Rotating Mass ("ERM") actuator in which an eccentric mass is moved by a motor, a Linear Resonant Actuator vibration motor ("LRA"), electro-active polymer actuator, or a piezoelectric actuator, etc. Kinesthetic actuators may be used to provide haptic feedback through mechanical movement of a device.

SUMMARY

In one embodiment, a haptically-enabled device includes a flexible display component and a rigid component coupled to the flexible component. An input circuit coupled to the flexible component can detect deformation of the flexible component. A response module can provide haptic feedback based on the deformation.

In another embodiment, a device includes a flexible component and a rigid component coupled to the flexible component. An input circuit coupled to the flexible component can detect deformation of the flexible component. A response module can provide a change in the state of an application executed on the device based on the deformation.

In another embodiment, a device includes a flexible component and a rigid component coupled to the flexible component. The rigid component can be made of rigid members attached by a flexible connection and coupled to a motor. An input circuit coupled to the device can accept input information. A drive circuit can alter the flexible connection by the motor causing the flexible component to deform from one state to another.

BRIEF DESCRIPTION OF THE DRAWINGS

FIG. 7 is a flow diagram illustrating input by deformation of the deformable component in accordance with some embodiments.

FIG. 8 is a flow diagram illustrating providing haptic feedback in response to detecting deformation of a docked device with flexible and rigid components in accordance with some embodiments.

DETAILED DESCRIPTION

One embodiment is a device with a deformable component and a rigid component. The two components can be different separable devices attached together as a system device. The deformable component can be a flexible display and the rigid component can be a dock. The device can provide haptic feedback associated with gestures and manipulation detected on the device. For example, a user can interact with an application running on the device by deforming the deformable component, including by bending or warping the deformable component. A sensory system on the device can capture the deformation and/or force and/or pressure applied by the user. The system can provide a response based on the deformation, including providing an appropriate haptic feedback response or controlling an application on the display in a certain way. In embodiments using haptic feedback, vibrotactile and/or kinesthetic feedback can be used. For example, kinesthetic feedback can make the deformable component more or less rigid and vibrotactile haptics can be used to provide various effects in response to bending the device. Haptic feedback can be provided on the rigid and/or deformable components. Vibrotactile haptics can propagate from the source component of the vibrations to other attached components.

In another embodiment, the deformable component can be a dock or other mounting device or grounding fixture and the rigid component can be a display. The display can be housed in the dock. As above, the device can provide haptic feedback associated with gestures and manipulation detected on the device. The system can provide a response based on the deformation, including providing an appropriate haptic feedback response or controlling an application on the display in a certain way.

In another embodiment, the deformable component can be a flexible display and the rigid component can be a movable dock. For example, while the dock is made of rigid parts, the parts of the dock can have hinges that cause the dock to move to change shape. When the flexible display is docked, the movable dock can deform the shape of the flexible display. As above, the device can provide haptic feedback associated with gestures and manipulation detected on the device. The system can provide a response based on the deformation, including providing an appropriate haptic feedback response or controlling an application on the display in a certain way.

In another embodiment, the deformable component can be a flexible display and the rigid component can be a dock that can attach to each side of the flexible display as removable rigid handles to the display. As above, the device can provide haptic feedback associated with gestures and manipulation detected on the device. The system can provide a response based on the deformation, including providing an appropriate haptic feedback response or controlling an application on the display in a certain way.

Figure 1:
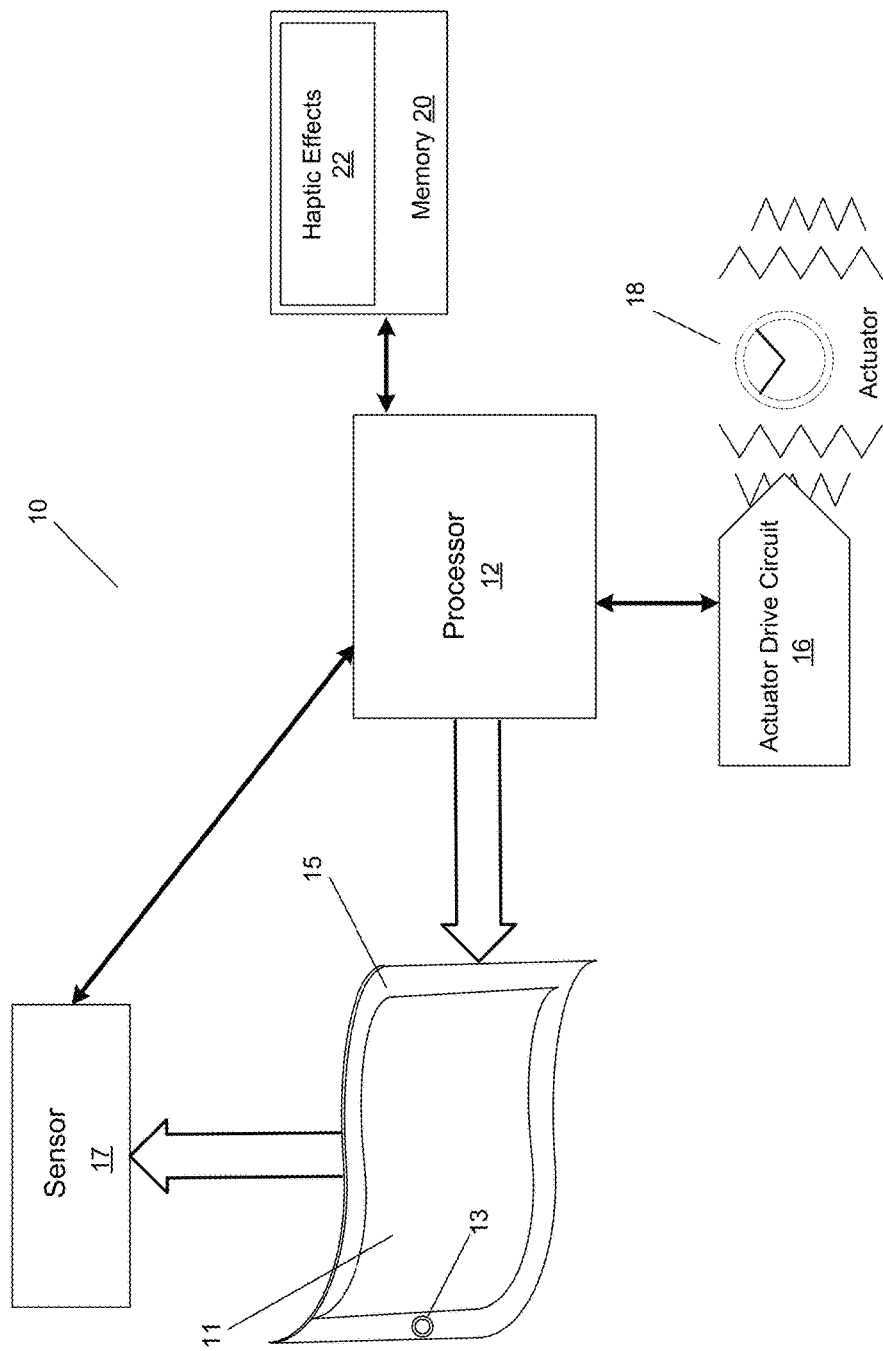
FIG. 1 is a diagram of a haptically-enabled system in accordance with one embodiment of the present invention.

FIG. 1 is a block diagram of a haptically-enabled system 10 in accordance with one embodiment of the present invention. System 10 includes a touch sensitive deformable surface 11 or other type of user interface mounted within a housing 15, and may include mechanical keys/buttons 13. Internal to system 10 is a haptic feedback system that generates vibrations on system 10. In one embodiment, the vibrations are generated on touch surface 11. In some embodiments touch surface 11 does not include touch capabilities.

The haptic feedback system includes a processor or controller 12. Coupled to processor 12 are a memory 20 and an actuator drive circuit 16, which is coupled to an actuator 18. Actuator 18 can be any type of motor, including without limitation an Eccentric Rotating Mass ("ERM"), a Linear Resonant Actuator vibration motor ("LRA"), a piezoelectric motor, or a solenoid actuator. In addition to or in place of actuator 18, system 10 may include other types of haptic output devices (not shown) that may be non-mechanical or vibrotactile haptics devices such as devices that generate electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. In instances where the haptic effects correspond to the playback of a multimedia file, such as a video file, processor 12 may provide the haptic control signal to the haptic drive circuit. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects, as disclosed in more detail below. Memory 20 may also be located internal to processor 12, or any combination of internal and external memory.

Touch surface 11 recognizes touches, such as those provided by a user, and may also recognize any of the position, pressure magnitude, and duration of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches and the location of the touches that occur at the same time. Touch surface 11 may be a touchscreen that generates and displays images for the user to interact with, such as keys, dials, etc., or may be a touchpad with minimal or no images.

System 10 may include a variety of sensors, such as sensor 17, for sensing interactions with the foldable-bendable display shown in FIG. 1 including, among others: strain gauge sensors to measure the deformation magnitude during interactions, force sensing resistor ("FSR") sensors to measure the force/stress applied to the flexible display structures, multi-touch touch sensors to detect the location of single or multiple touch inputs in a touch-enabled display, multi-touch pressure sensors to measure the pressure applied under each touch location, temperature/humidity/atmospheric pressure sensors to capture environmental conditions, an accelerometer/gyroscope/magnetometer to characterize the motion, velocity, acceleration and orientation of the display, a microphone to capture a user's voice command or environmental audio information, and wireless transmitters to receive/transmit information from/to other devices wirelessly. The data corresponding to sensor 17 is sent to processor 12, or another processor within system 10, and processor 12 interprets the sensor data and provides a response that can include haptic effects.

In addition to the actuators discussed above, system 10 may include a variety of haptic output devices for providing vibrotactile or kinesthetic feedback including flexible, semi-rigid, or rigid materials, including Electro Active Polymer ("EAP") actuators, smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

System 10 may be a handheld device, such a cellular telephone, personal digital assistant ("PDA"), smartphone, computer tablet, gaming console, vehicle based interface, etc., or may be any other type of deformable device that includes a haptic effect system that includes one or more actuators. The user interface may be a touch sensitive surface, or can be any other type of user interface such as a mouse, touchpad, mini-joystick, scroll wheel, trackball, game pads or game controllers, etc. In embodiments with more than one actuator, each actuator that has rotational capability may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device.

In addition to providing user interfacing haptic effects, system 10 may provide haptic effects for playback in system 10 that are not in direct response to a user's interaction. For example, haptic effects playback can be played from haptics data embedded in or generated from a video or audio file. In another example, haptic effects can be provided as a result of some system process, such as notifying an incoming telephone call, playing an alarm, or notifying an application event.

Flexible displays in general allow for a wide array of novel interactions by taking advantage of deformation as an additional information entry mechanism. Deformation gestures can provide intuitive mappings between the gesture and control. For example, a user could twist a deformable device to rotate a three dimensional object displayed or control the throttle in a racing game.

Touch interfaces can be difficult to use in situations where vision is occupied elsewhere, such as while driving or focusing on a computer monitor or other activity.

Docked devices are often used in the same manner as if they were not docked. A touchscreen smartphone, for example, can be used normally while docked on a sound system. But, using a rigid touchscreen device while docked can be difficult because the location or orientation of the device can make the screen difficult to work with. The angle of the device in the docking station may cause reflections that occlude the screen, and touch input may require uncomfortable gestures. Some embodiments of the present invention also enable interaction with deformable devices while they are docked, providing a mechanism to allow input gestures through deformation with a single hand. Typically, a user would deform a bendable device using two hands—one hand to hold the device and the other hand to perform the bending action or both hands bending the device together. One handed deformation of a bendable device can be useful, however, in certain contexts. For example, a one handed operation can require less visual attention and be more pleasant, intuitive, engaging, and useful than the alternative of touch input.

Combined with haptic feedback, embodiments with deformable interfaces can provide intuitive metaphors that relate events occurring digitally to physical interactions from a non-digital space. Embodiments expand the user interface design space, enhance the interaction experience with flexible displays, and render deformation-based gestures more intuitive and natural. Moreover, embodiments can provide an effective way to translate and deliver information about the digital world in the form of haptics.

Figure 2:
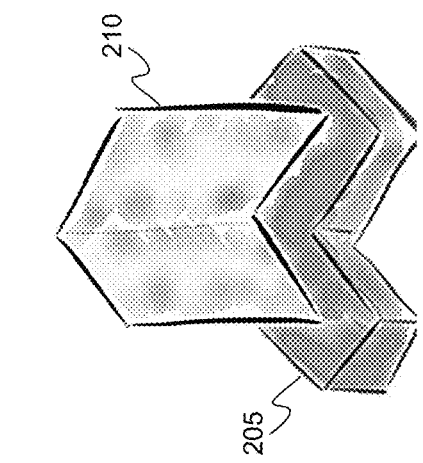
FIG. 2 illustrates a device with a deformable component and a rigid component in accordance with some embodiments.

FIG. 2 illustrates a device with a deformable component and a rigid component in accordance with some embodiments. Element 205 is a dock component made of rigid parts. Element 210 is a deformable display that can be inserted into dock 205. Although dock 205 is "rigid" it has additional capabilities that enable dock 205 to bend or fold. Motors can be used to bend the rigid members at hinges between the rigid members. When display 210 is docked, it can bend to accommodate the current shape of dock 205. Thus, dock 205 can control the bend of display 210.

Figure 3:
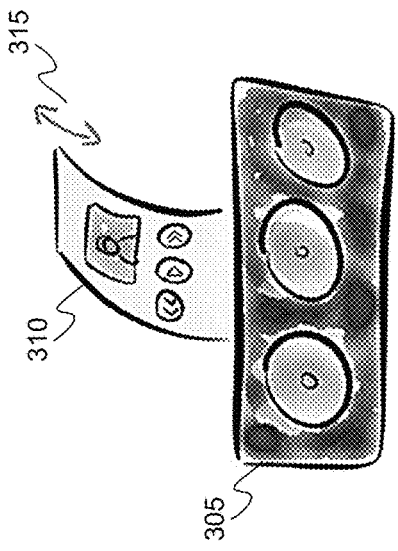
FIG. 3 illustrates a device with a deformable component and a rigid component in accordance with some embodiments.

FIG. 3 illustrates a device with a deformable component and a rigid component in accordance with some embodiments. Element 305 is a rigid dock component. Element 310 is a deformable display that can be inserted into dock 305. Element 315 represents a deformation gesture applied to display 310 such as bending the display. In general, dock 305 can be a speaker, alarm clock, charging station, or other type of base. Aspects of dock 305 can be controlled by deformation gesture 315. For example, gesture 315 can increase volume, skip playback tracks, pause/play a playlist, "sleep" an alarm, and so forth.

Figure 4:
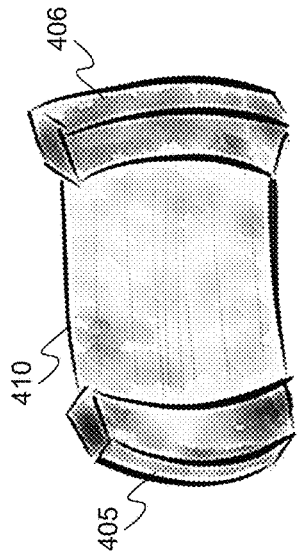
FIG. 4 illustrates a device with a deformable component and a rigid component in accordance with some embodiments.

FIG. 4 illustrates a device with a deformable component and two rigid components in accordance with some embodiments. Elements 405 and 406 are two rigid handles. Element 410 is a deformable display that can be attached to handles 405 and 406. In some embodiments, only handle 405 can be attached. In some embodiments the two handles 405 and 406 can be connected together by a flexible member (not pictured) that can bend according to the deformation of deformable display 410. The flexible member can be approximately the same size and shape of display 410 or can be larger or smaller. In some embodiments, the flexible member can be made up of multiple smaller flexible members that connect handle 405 to handle 406. In some embodiments handles 405 and 406 can be permanently attached, while in others, they can be removable.

Each of the devices shown in FIGS. 2-4 as different embodiments of system 10 can have haptic effects capabilities as provided by actuator 18 or other haptic output device as described in relation with FIG. 1 integrated into the dock, display, or both. Sensor 17 of FIG. 1 can likewise be integrated into the dock, display, or both. Sensor 17 would typically be integrated into the deformable component to detect deformation using strain sensors as discussed in relation to sensor 17 of FIG. 1, but sensor 17 can also be integrated into the rigid component of system 10. For example sensor 17 in the rigid component can sense the presence of the deformable component or pressures exerted at the connection point between the rigid and deformable components as the deformable component is deformed.

In another embodiment, both a docked device (e.g., a display) and dock can be rigid. At the connector for the display to the dock, a hinge or flexible component can be incorporated to allow the display to move relative to the dock. The movement can be used as input and provide haptic feedback. Haptics can be added to the flexible hinge or connector to provide kinesthetic feedback to make the flexing of the hinge more or less flexible or actively resist flexion. Haptics can be added to the dock or display to provide vibrotactile haptics. Using a flexible hinge or connector between two rigid components can provide the user with the sensation or effect that the display is flexing in response to input that actually flexes the hinge or flexible connector.

In another embodiment, both a docked device (e.g., a display) and dock can be rigid. The connector for the display to the dock can also be rigid. A wobbling component can be added to the dock to allow the device and dock to wobble. When a user pushes or pulls on the display, the display can react to wobble away or toward the user respectively. The movement can be used as input and provide haptic feedback. Haptics can be added to the wobbling component to provide kinesthetic feedback to make the dock more or less wobbly or to actively resist wobbling. Haptics can be added to the dock, display, or wobbling component to provide vibrotactile haptics. The wobble can provide the user with the sensation or effect that the display is flexing in response to the input that actually causes the dock/display combination to wobble on a wobbling component.

Other embodiments not pictured can include other devices having a rigid component and a flexible component. For example, one embodiment can include a flexible component attached to a permanently attached rigid component, such as a dock fixture in an automotive interface (e.g., a dashboard). The flexible display can be deformed to control scrolling through a menu (located on the flexible display or another display in the automotive interface) or perform other user input. In another example, a flexible display can be docked next to a computer workstation and used to input commands into the computer workstation, such as rotating a three dimensional model displayed on the computer workstation by twisting the flexible display or bending the flexible display with one hand. In another example, a flexible display can be docked at a gaming controller and serve as another control input into the game, such as a flexible display inserted into a slot on a game controller or arm chair and flexed to provide accelerator or braking input to a racing game.

In other embodiments not pictured, a deformable device can be used as an input mechanism to control other devices, such as those forming an interconnection of uniquely identifiable embedded computing-like devices within the existing Internet infrastructure, referred to as the "Internet of Things." For example, a flexible device can be inserted into a smart coffee maker with a docking slot for the flexible device. The device can be bent forward or backward to control the coffee maker or, where the device is a flexible display, perform other complex functions based on the user interface on the flexible display. In another example, a flexible device can be inserted into a dock for controlling a feature of a smart house, such as controlling doors to lock and lights to turn off in the house when docked and deformed in a certain way on a night stand. In another example, a flexible display device in a dock or attached to a rigid component can execute an application that can receive deformation inputs as commands to control wirelessly connected devices in the Internet of Things.

In other embodiments, the display can be rigid and the flexible portion can be another component. For example, in a gaming device with a rigid display, a game cartridge can be flexible. Manipulating the cartridge can cause the gaming device to react in different ways, for example, loading different options into the game or controlling a character in the game.

Similarly, some embodiments may have flexible and rigid components without any display. For example, a universal serial bus ("USB") memory thumb drive can be flexible and, when inserted into a USB port, can be manipulated (e.g., flexed or bent) to input commands. The same can extend to other connectible devices. For example, high-definition multimedia interface ("HDMI"), video graphics array ("VGA"), Ethernet, audio, and other connectors can have deformable portions (other than a wire) that can be flexed or bent to provide input. The same can extend to other devices that may already have some flexibility. For example, a deformable key card for a hotel room or other purpose could be inserted into a slot and bent or flexed to provide input (e.g., setting a "do not disturb" flag or turning the lights and air conditioning on or off in the room).

One skilled in the art will recognize that each of the example embodiments described above that include displays can instead include some other flexible interface to act as an input interface. For example, the embodiment described above with respect to FIG. 4 can, instead of including a flexible display, include a flexible material that can be deformed for input (e.g., the device could be a game controller and the flexible material can include other touch control input devices).

Figure 5:
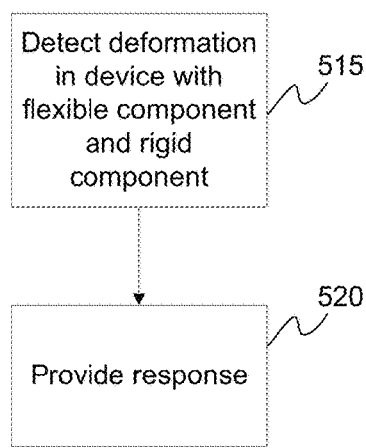
FIG. 5 is a flow diagram illustrating input by deformation of the deformable component in accordance with some embodiments.

FIG. 5 is a flow diagram illustrating input by deformation of the deformable component in accordance with some embodiments. In some embodiments, the functionality of the flow diagram of FIG. 5 (and FIGS. 6, 7, 8, 10, and 11 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

A user can manipulate a device with a flexible component and a rigid component to input data into the device by deforming the device in a particular way. For example, interfacing with a music application executing on the device, the user can bend the flexible component in a particular way and cause the device's volume setting to increase, skip to the next song, pause or play the song, or fast forward. A variety of other contexts can be used including gaming, automotive or computer interfaces, and conventional docks such as charging stations, alarm clocks, or sound systems.

At 515, deformation is detected in the device with flexible and rigid components. Deformation can be detected via various types of sensors, such as those described in relation to sensor 17 of FIG. 1.

At 520, based on the deformation, a response can be provided. An application can use sensor data from sensor 17 to determine the type of deformation being applied to the deformable device. Based on the type of deformation or the sensor data, an appropriate response can be provided. For example, in a music application the response can be increasing the device volume or causing a song to skip to the next track. In a three dimensional object display application, the three dimensional object could be rotated. In a photo viewing application, a photo could be zoomed in or out or rotated, the next photo in the album loaded, or a slideshow begun or speeded up. Other appropriate responses can also include haptic feedback.

Figure 6:
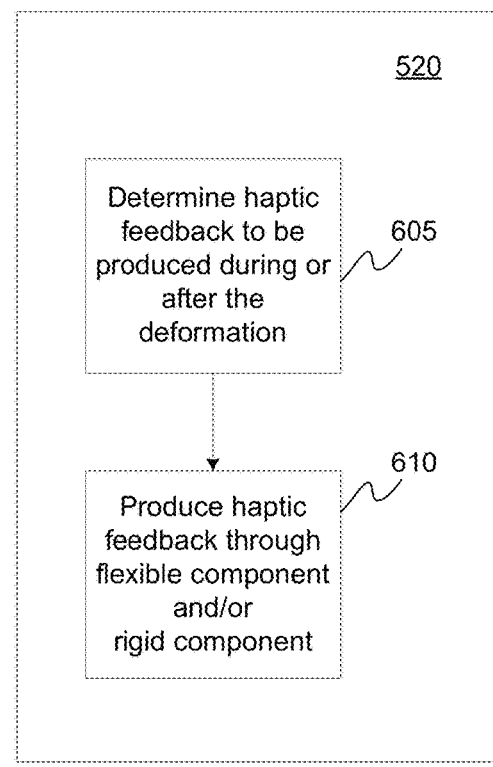
FIG. 6 is a flow diagram illustrating providing haptic feedback in response to detecting deformation of a device with flexible and rigid components in accordance with some embodiments.

FIG. 6 is a flow diagram illustrating providing haptic feedback in response to detecting deformation of a device with flexible and rigid components in accordance with some embodiments. In particular, FIG. 6 illustrates producing haptic feedback as part of the provided response of flow element 520 of FIG. 5. At 605, haptic feedback is determined to be produced during or after the deformation. For example, sensor data from sensor 17 can be used to determine what kind of deformation is occurring. Sensor data can demonstrate how much deformation is occurring, what direction deformation is occurring, how much pressure is being applied, and so forth. Haptic feedback can be produced during the deformation or after the deformation based on device and application settings. For example, the embodiment of FIG. 4 could be used to control a gaming application with a race car. Handle 406 could be twisted to control the race car's accelerator setting. Handle 405 could be twisted momentarily to control a transmission shift setting up or down. As the car is accelerating and shifting haptic feedback could be provided by handle 406 and 405, respectively, to provide a more immersive gaming experience.

At 610, haptic feedback is produced through the flexible component and/or rigid component of the device. In the car racing application, for example, haptic feedback can be provided in handle 406 representing acceleration or braking, handle 405 representing shifting, and the flexible display 410 (or either one or both of handles 405 and 406) representing road rumble. In another example, haptic feedback can represent a creaking feeling in the display to simulate stress fracturing in glass. As sensor data from sensor 17 indicates more deformation, the creaking sensation can intensify or become more rapid. Other haptic effects can include other texture or realistic effects to certain gestures.

The use of haptics can confirm commands or state transitions. For example, one haptic effect can result in a sensation similar to a pop. Haptic effects can facilitate precise gestures by providing ticks and unpleasant textures when exceeding the flexible component's deformation range. Haptic effects can also provide information, such as a directional effect in a car indicating the next turn in a navigation application.

Haptic feedback can include several forms including vibrotactile effects and kinesthetic effects provided by actuator 18 including active deformation such as bending or shape changing, and passive deformation such as resistance to bending.

FIG. 7 is a flow diagram illustrating input by deformation of the deformable component in accordance with some embodiments. A user can dock a flexible device into a rigid dock (or dock with hinged rigid components). The flexible device and rigid dock form a device with a flexible component and a rigid component. The user can manipulate the device to input data into the device by deforming the device in a particular way. The dock can be stationary allowing for one handed operation. For example, interfacing with a music application executing on the device, the user can use one hand to bend the flexible component in a particular way and cause the device's volume setting to increase, skip to the next song, pause or play the song, or fast forward.

At 705, an application on the flexible device can detect a dock after a user inserts the flexible device into the dock. The flexible device and dock can be connected mechanically and/or electrically. In some embodiments the device and dock can communicate wirelessly. For example, in the embodiment of FIG. 3, a user can insert flexible display 310 into dock 305. A mechanical connection can keep device 310 securely fastened to dock 305. An electrical connection can allow dock 305 and display 310 to communicate and/or transfer power. Dock 305 can be secured, weighted, or rest on a surface (not pictured). The same example can apply to the embodiment of FIG. 2.

At 710, the device mode can be changed after detecting the dock. The device can launch an application with a related user interface or configuration setting that will interface the device with the dock. For example, in the embodiment of FIG. 3, when device 310 is inserted into dock 305, an application can automatically launch on the device for controlling dock 305. For example, if dock 305 is a speaker or alarm clock base, device 310 can control dock 305 to output audio over the speakers in dock 305.

At 715, deformation is detected in the device with flexible and rigid components. Deformation can be detected via various types of sensors, such as those described in relation to sensor 17 of FIG. 1. The deformation can be applied by a user using only one hand.

At 720, based on the deformation, a response can be provided. An application can use sensor data from sensor 17 to determine the type of deformation being applied to the deformable device. Based on the type of deformation or the sensor data, an appropriate response can be provided. For example, in a music application the response can be increasing the device volume or causing a song to skip to the next track. In a three dimensional object display application, the three dimensional object could be rotated. In a photo viewing application, a photo could be zoomed in or out or rotated, the next photo in the album loaded, or a slideshow begun or speeded up. Other appropriate responses can also include haptic feedback.

FIG. 8 is a flow diagram illustrating providing haptic feedback in response to detecting deformation of a docked device with flexible and rigid components in accordance with some embodiments. In particular, FIG. 8 illustrates producing haptic feedback as part of the provided response of flow element 720 of FIG. 7. At 605, haptic feedback is determined to be produced during or after the deformation. For example, sensor data from sensor 17 can be used to determine what kind of deformation is occurring. Sensor data can demonstrate how much deformation is occurring, what direction deformation is occurring, how much pressure is being applied, and so forth. Haptic feedback can be produced during the deformation or after the deformation based on device and application settings. For example, the embodiment of FIG. 2 could be used to control a photo viewing application. Flexible display 210 can be deformed to advance the photo being viewed to the next photo in the album or instruct the application to display two photos side-by-side. When two photos are displayed side-by-side, the application can instruct dock 205 to bend at a hinge located within the rigid design, providing haptic feedback by bending the flexible display. In turn, flexible display 210 will also bend in accordance with dock 205.

At 810, haptic feedback is produced through the flexible component and/or rigid component of the device. In the photo viewing application, for example haptic feedback can be provided in dock 205 or flexible display 210. Similarly, haptic feedback can be produced in the embodiment of FIG. 3.

Figure 9:
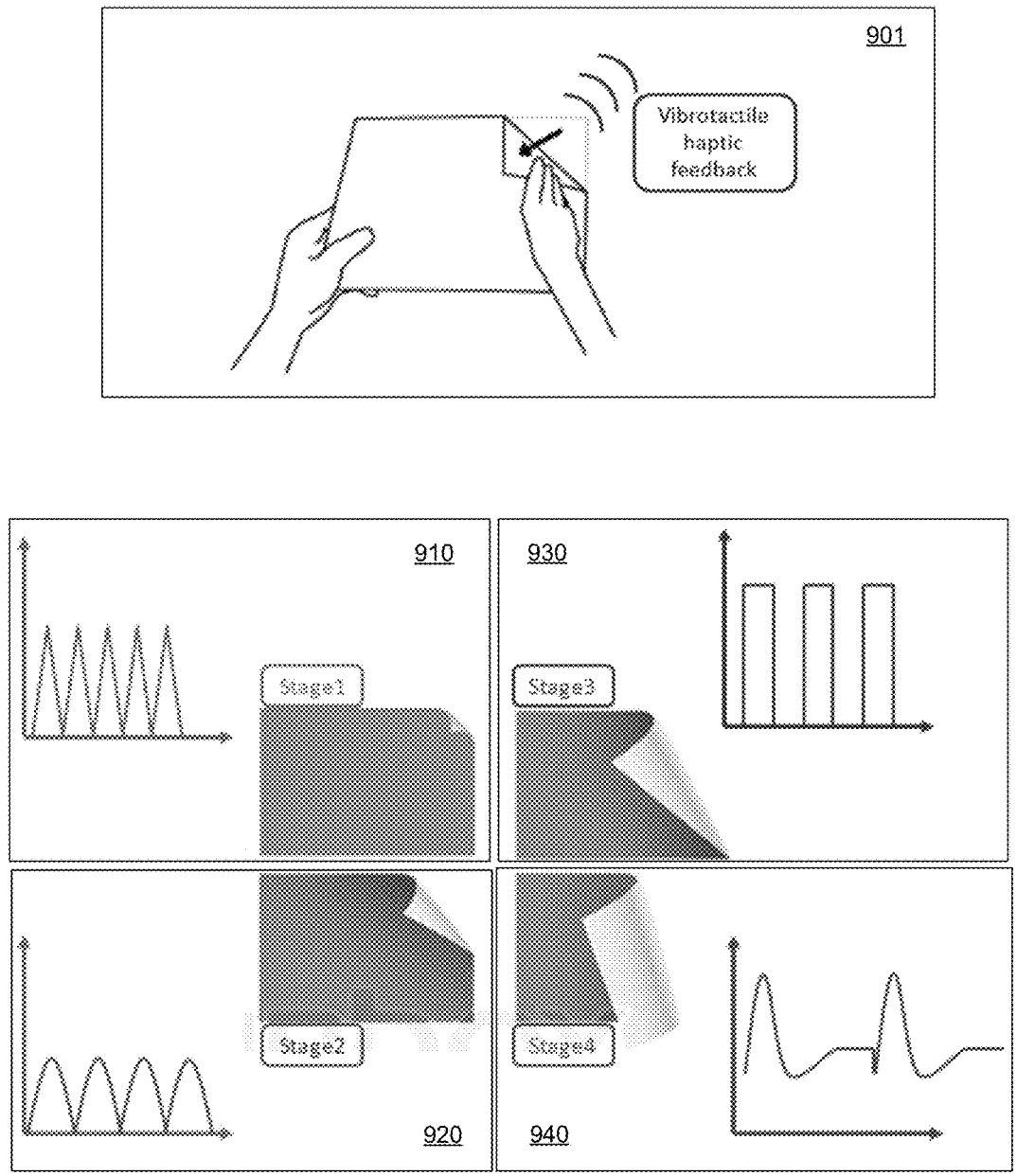
FIG. 9 illustrates actions associated with the deformation of a device having flexible and rigid components in accordance with some embodiments.

FIG. 9 illustrates actions associated with the deformation of a device having flexible and rigid components in accordance with some embodiments. In 901, a user bends the corner of the device. In docked embodiments, a user can bend the corner with one hand. A haptic response can be played in the form of vibrotactile feedback. The corresponding interaction mapping to a type of haptic effect, however, can depend on the range/threshold of bending magnitude. Four different mapping schemes are distinguished in FIG. 9. Each stage corresponds to a certain bending angle range, e.g., stage 1 (at 910) if bending angle lies between 0 and 10 degrees, stage 2 (at 920) between 10 to 20 degrees, stage 3 (at 930) between 20 to 30 degrees, and stage 3 (at 930) between 30 to 40 degrees, and so forth. Each stage can have a different functionality or mapping associated with it. For example, in a photo browsing application, bending the corner of the device (back and forth) between 0 to 10 degrees (910) can be mapped to scrolling through a set of pictures. Bending the corner of the device beyond 10 degrees up to 20 (920), can allow the user to continuously zoom in/out the pictures. In stage 3 (930), the user can use the bending gesture to adjust the brightness of the picture. Finally in stage 4 (940), bending input can be used to alter the transparency of the picture. In this embodiment, the type, strength and pattern of the tactile effects delivered to the user can be different for each stage, as indicated in the graphs accompanying each of stages 910, 920, 930, and 940.

In such embodiments, haptics not only augment the continuous interaction in each stage, it also helps the user distinguish between different stages/mapping schemes related to various functionalities. This allows interaction with the device in situations where visual confirmation of device manipulation can be distracting. For example, answering a phone call with a twist or other deformation prevents a user from having to look at the user's phone. The transition between the stages can be haptically marked (for example, with a vibrotactile cue) to provide the user with tangible insight as to differentiating between the stages. The user can use haptic marks to explore among various functionalities without the need for audiovisual cues. One skilled in the art will understand that although bending angle is used as the range distinction parameter in the above example, the particular bending angles can be chosen differently and other parameters such as force, etc., could also be used for this purpose.

Similar to vibrotactile feedback, kinesthetic haptics can offer benefits in similar or different contexts, by augmenting the interactions. Examples of kinesthetic haptics include programmable stiffness display (stiffness control), structural damping (damping factor resisting bending and other deformation degrees of freedom), etc. Feedback can be a combination of both vibrotactile haptics and kinesthetic haptics.

In some embodiments, the natural or structural stiffness and damping of the materials used in flexible displays can be augmented with programmable haptic stiffness control to enrich the deformation gesture language and enhance the effectiveness of the interface. For example, the user can use deformation gestures to browse through his/her list of contacts. As the user becomes closer the end of the list, haptic stiffness control can vary the perceived resistance against the deformation, providing the user with a sense of where the user is in the list. Once the user reaches the end of the list, the haptic stiffness scheme can create a haptic "barrier" by making the display non-deformable/rigid in one direction, preventing the user from bending further. Likewise, when the user is far from the end of the list, the display can be made to be less rigid by countering the natural deformation resistance of the device using kinesthetic haptics. In other words, the range of deformation of the bendable display can be controlled using haptics. Further, kinesthetic stiffness/damping control or vibrotactile effects can be used to haptically mark each item in the list with programmable detents. For example, a different haptic effect/mark can be used when the user passes between different alphabetic groups.

In one embodiment, the perceived haptic "stiffness" or deformation resistance of the display can be customized and tailored to the requirements of the current application or required functionality. For example, a user may intend to use a deformation gesture in a docked flexible display to fast forward a sound track, but in small increments or time steps. The stiffness of the display can be actively controlled to assist the user to deform (bend) the display in a controlled gradual manner, with the level of bending corresponding to the size of the increments or time steps either as a fixed size increase or as a percentage of the file length.

Another embodiment provides kinesthetic haptic feedback associated with a device with a flexible and rigid component to adjust the perceived elasticity or deformability of the flexible component based on the target interaction. Here a device's natural "elasticity" means the ease of flexion, folding, or rolling that a deformable device has in its natural state based on the material properties and build of the device. A programmable haptic stiffness control mechanism can adjust the elasticity or deformability of the display depending on the target interaction. In other words, depending on the interactions and the target function, the bendable interface becomes more stiff if a more rigid interface is required, or becomes softer (easier to deform) if user is applying a deformation-based gesture.

Figure 10:
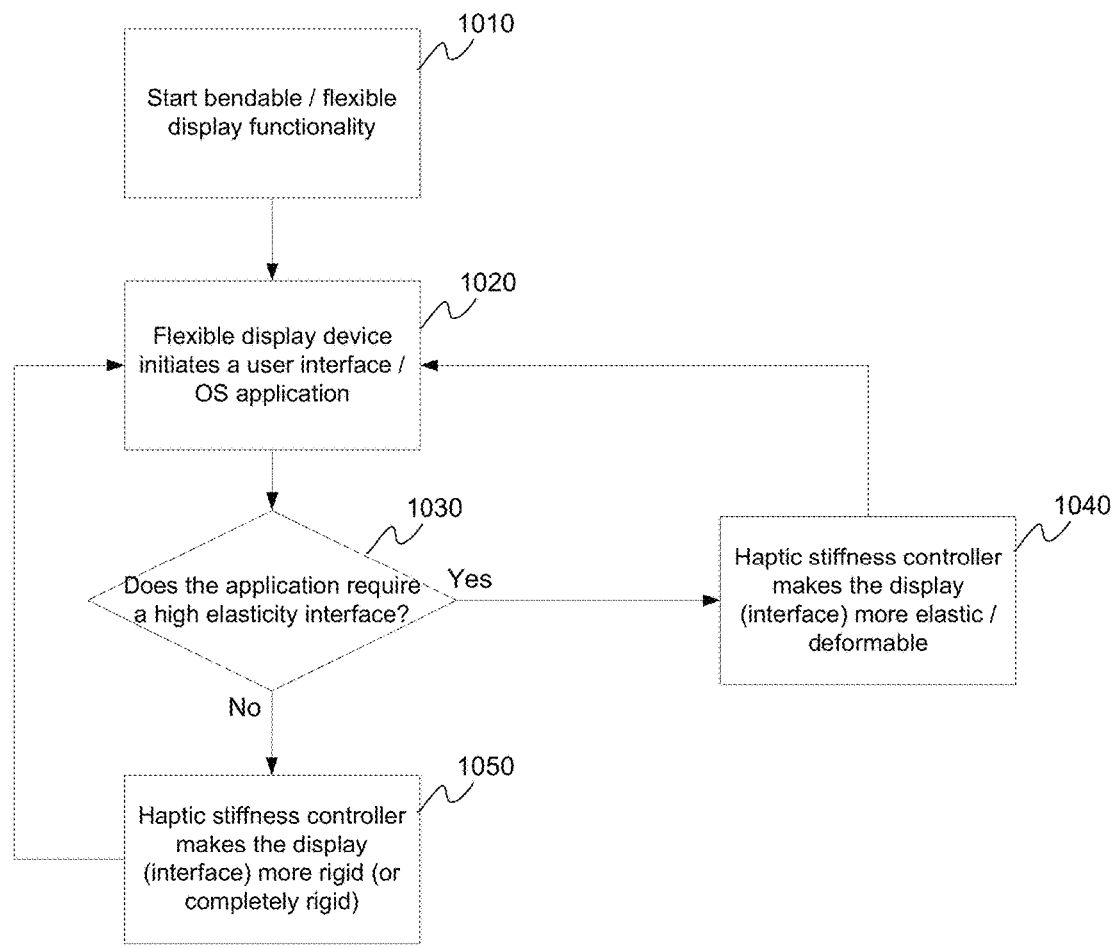
FIG. 10 is a flow diagram illustrating the providing of haptic feedback in a flexible device with deformable and rigid components in accordance with some embodiments.

FIG. 10 is a flow diagram illustrating the providing of haptic feedback in a flexible device with deformable and rigid components in accordance with some embodiments. FIG. 10 illustrates a flow where an application requires a certain stiffness or flexibility of a flexible display which is static while the application is running. At 1010, display functionality is started on a flexible display device. The flexible device can be bendable, foldable, rollable, or a combination thereof. At 1020, an application is started on the flexible display device that has the ability to request a certain elasticity. The application may be a process native to the operating system, such as a home screen, settings screen, or notifications screen, or may be a user-installed application.

At 1030, the flow determines whether the application requires a highly flexible interface. For example, the device can determine whether the intent is to bend the device (requiring flexibility) or interact with the touchscreen (requiring rigidity) based on the location of the touch input. When grasping the edges, the user may be about to bend the device, which should remain flexible. When touching closer to the middle of the screen, the user likely desires to interact with the screen and a rigid surface may be better than a flexible one. The surface can also become rigid when the user interacts with it using a stylus. If a high flexibility is required, at 1040, a haptic stiffness controller, such as actuator drive circuit 16, can make the display more elastic or deformable. Greater flexibility can be achieved by allowing the deformable component to flex naturally or by augmenting the flexion of the device to assist flexion when a user applies bending/folding/rolling force to make it seem "easier" to the user to flex and manipulate the device. If at 1030, the application requires low (or no) flexibility, then at 1050 the haptic stiffness controller can make the display more rigid or completely rigid. Rigidity can be achieved by controlling one or more actuators, such as actuator 18, to resist deformation of the flexible display. When a user switches applications or when a function of the application changes, the flow can repeat back to 1020 from either 1040 or 1050.

Figure 11:
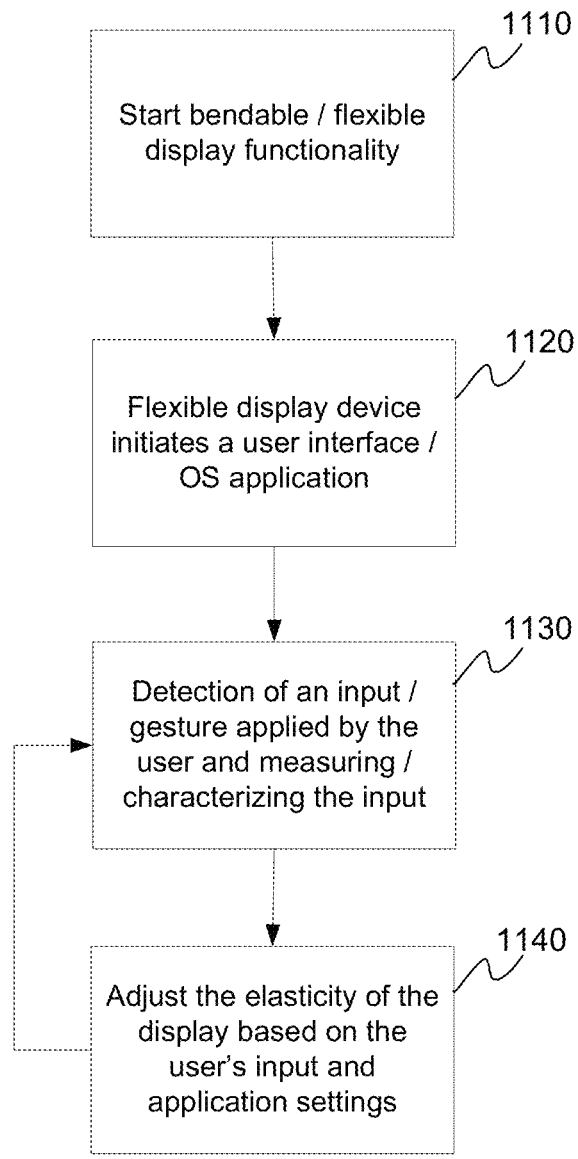
FIG. 11 is a flow diagram illustrating the providing of haptic feedback in a flexible device with deformable and rigid components in accordance with some embodiments.

FIG. 11 is a flow diagram illustrating the providing of haptic feedback in a flexible device with deformable and rigid components in accordance with some embodiments. FIG. 11 illustrates a flow where an application requires a stiffness or flexibility of a flexible display that is dynamically adjustable while the application is executing based on a user's interaction with the application and device. At 1110, display functionality is started on a flexible display device. The flexible device can be bendable, foldable, rollable, or a combination thereof. At 1120, an application is started on the flexible display device that has the ability to request a certain elasticity of the display dynamically throughout the course of the application execution. The application may be a process native to the operating system, such as a home screen, settings screen, or notifications screen, or may be a user-installed application. At 1130, an input or gesture is detected by the device through flexible display 17, touch interface 11, or other input interface. The input is measured and characterized by the application. At 1140, the elasticity of the display is adjusted based on the user's input and the application settings. Elasticity can be adjusted to be more rigid or more flexible. Rigidity can be controlled by a haptic stiffness controller, such as actuator drive circuit 16, to control one or more actuators, such as actuator 18, to resist deformation or assist in deformation of the flexible display to make the display more or less rigid, respectively. In some embodiments, the haptic stiffness controller can be controlled to be passive to allow the elasticity to be the same as the natural elasticity of the device. Flow can continue to step 1130 to continue detecting further input and reacting accordingly.

In one embodiment consistent with the flow illustrated in FIG. 10, the rigidity of a flexible display, such as display 11 can be adjusted to be stiffer when a user is inputting text. Applications implementing text entry require the screen to be rigid, otherwise the display deforms away from user's finger every time they want to press a key. Moreover, the shape of the device and spatial arrangements of the keys should remain fixed during the keyboard entry for muscle memory to be effective during writing. As soon as the user launches the keyboard entry application, the haptic controller can stiffen the display, making it suitable for the function (facilitating typing interactions).

In another embodiment consistent with the flow illustrated in FIG. 11, the flexible display can be equipped with embedded strain gauges and force sensors, such as sensor 17, which can characterize the deformation and force inputs applied by the user, and a pressure-sensitive touch screen, such as touch surface on 11, mounted on the flexible display. The device in its original mode can be rigid, allowing the user to interact with different OS/interface functions. However, when the user applies a bending force or touch pressure beyond a certain value or threshold, the device can switch to become deformable or less rigid. Therefore, the user can command the device to become soft when a softer interface is required, but can take advantage of rigidity of the display in other scenarios. Flexible devices can be damaged by excessive deformation. Thus, in another example, haptic feedback can be used to warn users when they are about to exceed the maximum deformation supported. The device can become rigid, and produce an abstract but unmistakable warning with vibration, or produce a squeaking sensation with granular synthesis that intuitively communicates that it is bending too much. This input monitoring and dynamic elasticity adjustment facilitates interactions with flexible displays across a variety of functionalities, rendering the interface more effective for both the interactions that require a soft display as well as those requiring a stiffer one.

One of skill in the art will understand, however, that deformation of the display may not necessarily occur, and the sensory system can capture the force/pressure applied by the user. For example, kinesthetic haptics can render the display stiff, in which case a small amount of force applied by the user will not lead to any physical deformation. However, the system can still provide a vibrotactile or other type of "haptics response" to such interactions by the user, i.e. pressure applied without deformation occurring.

As disclosed, embodiments implement a flexible display device including a deformable component and a rigid component. The rigid component can include a dock or one or more handles attached to the flexible component. A user can manipulate the flexible display device by deforming the device (bending, twisting, squeezing, etc.) as an input to control an application executing on the device. Deformation can be determined by sensors located on the device. When a dock is used, the dock can be attached or movable, and the flexible component can be permanently attached or removable from the dock. When handles are used, the handles can be used as rigid components to grab and apply input to the device. The flexible component can be used as an input while docked using only one hand. Haptic feedback can also be provided by haptic actuators or other haptic feedback devices located on the deformable component or on the rigid component (including the dock or handles). In some embodiments, haptic feedback can include a dock that can change shape using a motor in the dock to also cause the docked flexible component to change shape as well.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A haptically-enabled device comprising:
a flexible component;
a rigid component coupled to the flexible component;
a sensor coupled to the flexible component for detecting deformation of the flexible component; and
a response module configured to provide a haptic feedback based on the deformation, wherein the haptic feedback is used to adjust a rigidity property of the flexible component.

2. The device of claim 1, wherein the flexible component is a display.

3. The device of claim 2, wherein the response module further provides an application response for an application executed on the device.

4. The device of claim 1, further comprising:
a haptic output device; and
a drive circuit electronically coupled to the sensor and the haptic output device, wherein the haptic feedback is produced through the haptic output device.

5. The device of claim 4, wherein the haptic output device provides at least one of kinesthetic or vibrotactile feedback.

6. The device of claim 4, wherein the haptic feedback is provided in the rigid component or the flexible component.

7. The device of claim 1, wherein the rigid component is a dock, and the deformation indicates that the deformation was applied by one hand.

8. The device of claim 1, wherein the rigid component comprises handles coupled to sides of the flexible component.

9. The device of claim 4, wherein the haptic feedback used to adjust the rigidity property of the flexible component is based on settings in an application executed on the device.

10. A flexible display device comprising:
a flexible display component;
a rigid component coupled to the flexible display component;
a sensor coupled to the flexible display component for detecting deformation of the flexible display component; and
a response module configured to provide a response based on the deformation, wherein the haptic feedback is used to adjust a rigidity property of the flexible component.

11. The display device of claim 10, wherein the response from the response module includes an application response for an application executed on the display device.

12. The display device of claim 10, wherein the rigid component is a dock, and the deformation indicates that the deformation was applied by one hand.

13. The display device of claim 10, wherein the rigid component comprises handles coupled to sides of the flexible display component.

14. A flexible device comprising:
a flexible component;
a rigid component coupled to the flexible component, wherein the rigid component comprises two or more rigid members coupled by one or more flexible connections;
a motor coupled to the rigid members;
a sensor coupled to the rigid component for detecting input at a connection point between the rigid and deformable components; and
a drive circuit that alters the flexible connection using the motor, causing the flexible component to deform from one state to another.

15. The device of claim 14, further comprising:
a haptic output device; and
a drive circuit electronically coupled to the sensor and the haptic output device, wherein the haptic feedback is produced through the haptic output device.

16. The device of claim 14, wherein the rigid component is a dock.

17. A haptically-enabled system comprising:
a flexible component;
a rigid component coupled to the flexible component;
an input module configured to detect deformation of the flexible component; and
a response module configured to provide a haptic feedback based on the deformation, wherein the haptic feedback is used to adjust a rigidity property of the flexible component.

18. The system of claim 17, where in the flexible component is a display.

19. The system of claim 18, wherein the response module further provides an application response for an application executed on the device.

20. The system of claim 17, further comprising:
a haptic output device; and
a haptic feedback generator that generates the haptic feedback on the haptic output device based on information from the input module.

21. The system of claim 20, wherein the haptic output device provides at least one of kinesthetic or vibrotactile feedback.

22. The system of claim 20, wherein the haptic feedback is provided in the rigid component or the flexible component.

23. The system of claim 17, wherein the rigid component is a dock, and the input module indicates that the deformation was applied by one hand.

24. The system of claim 17, wherein the rigid component comprises handles coupled to sides of the flexible component.

25. The system of claim 20, wherein the haptic feedback includes kinesthetic feedback to adjust a rigidity property of the flexible component based on settings in an application executed on the device.

26. A flexible display system comprising:
a flexible display component;
a rigid component coupled to the flexible display component;
an input module configured to detect deformation of the flexible display and generate a haptic feedback; and
a response module configured to provide a response based on the deformation, wherein the haptic feedback is used to adjust a rigidity property of the flexible display component.

27. The system of claim 26, wherein the response from the response module includes an application response for an application executed on the display component.

28. The system of claim 26, wherein the rigid component is a dock, and the input module indicates that the deformation was applied by one hand.

29. The system of claim 26, wherein the rigid component comprises handles coupled to sides of the flexible display component.

30. A flexible component system comprising:
a flexible component;
a rigid component comprising two or more rigid members;
one or more flexible connections coupling the rigid members;
an input module configured to detect input into the system;
a rigid member control module configured to control the rigid members by altering the flexible connection using a motor, wherein altering the flexible connection causes the flexible component to deform from one state to another,
a haptic output device; and
a haptic feedback generator that generates a haptic feedback on the haptic output device based on information from the input module, wherein the haptic feedback is used to adjust a rigidity property of the flexible component.

31. The system of claim 30, wherein the rigid component is a dock.

* * * * *